United States Patent
Dimroth et al.

[11] 3,872,077
[45] Mar. 18, 1975

[54] AZO PIGMENTS FROM A 1-AMINOANTHRAQUINONE DIAZO COMPONENT AND A PHTHALIMIDACETOACETANILIDE COUPLING COMPONENT

[75] Inventors: Peter Dimroth; Joerg Redeker; Wolfgang Lotsch, all of Ludwigshafen, Germany

[73] Assignee: Badische Anilin- & Soda-Fabrik Aktiengesellschaft, Ludwigshafen, Rhein, Germany

[22] Filed: Apr. 23, 1973

[21] Appl. No.: 353,619

[30] Foreign Application Priority Data
May 17, 1972 Germany............................ 2224010

[52] U.S. Cl.................................. 260/152, 106/23
[51] Int. Cl.............................................. C09b 29/32
[58] Field of Search............................ 260/152, 193

[56] References Cited
UNITED STATES PATENTS
2,820,787    1/1958    Randall et al...................... 260/193

FOREIGN PATENTS OR APPLICATIONS
1,214,323    12/1970    United Kingdom.............260/152
1,221,182    2/1971    United Kingdom.............260/152
1,224,739    3/1971    United Kingdom.............260/152

*Primary Examiner*—Henry R. Jiles
*Assistant Examiner*—Robert W. Ramsuer
*Attorney, Agent, or Firm*—Johnston, Keil, Thompson & Shurtleff

[57] ABSTRACT

Azo pigments of the formula:

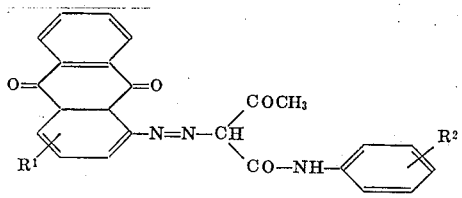

wherein $R^1$ is H, Cl in the 3- or 4- position to the azo group and $R^2$ is a phthalimide group in the meta-or para position. The yellow pigments are suitable for coloring surface coatings and plastics and for the production of printing inks. The pigments have excellent light fastness properties, weather fastness properties and fastness to over spraying.

2 Claims, No Drawings

AZO PIGMENTS FROM A 1-AMINOANTHROQUINONE DIAZO COMPONENT AND A PHTHALIMIDACETOACETANILIDE COUPLING COMPONENT

The invention relates to new azo pigments of the formula (I):

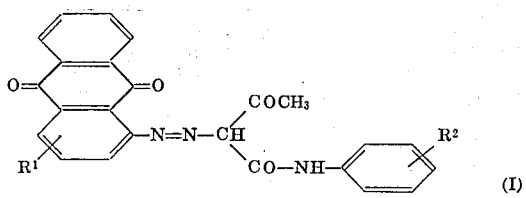

(I)

in which
R$^1$ is hydrogen or chloro in the meta-position or para-position to the diazo group; and
R$^2$ is a phthalimide radical in the meta-position or para-position.

The new yellow pigments of the formula (I) are outstandingly suitable for coloring paints and plastics and for the production of printing inks of high brilliance. They also have excellent light fastness properties, weather fastness and fastness to overspraying and are superior for example to the azo pigments of the same class disclosed in U.K. Pat. No. 1,224,739.

The pigment of the formula (II):

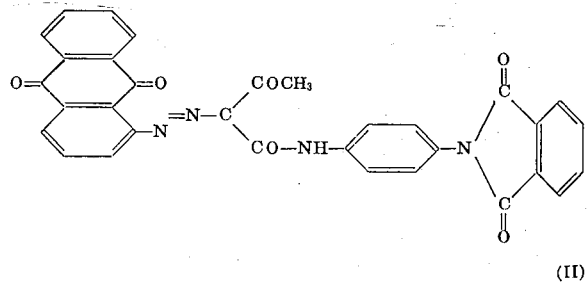

(II)

is particularly preferred and pigments of the formula (I) with R$^1$ = hydrogen are preferred because of their bright shades and good fastness properties.

The pigments may be prepared by diazotization and coupling by conventional methods. Examples of diazotization components are 1-aminoanthraquinone, 1-amino-3-chloroanthraquinone and 1-amino-4-chloroanthraquinone. Examples of coupling components are the phthalimidacetoacetanilides of the formula (III):

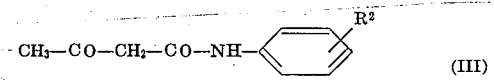

(III)

in which R$^2$ has the above meanings.

The pigments are often not in a physical form equally well suited to all applications as obtained in the manufacturing process. They may be adapted to the particular use by conventional methods, for example by heating a suspension in water or in an organic solvent.

The following Examples illustrate the invention. The parts and percentages given in the following Examples are by weight.

EXAMPLE 1

322 parts of particulate 4-phthalimidoacetoacetanilide is suspended in 5,000 parts of water. Then the diazonium sulfate prepared from 223 parts of 1-aminoanthraquinone is added with vigorous stirring at room temperature and the mixture is adjusted to pH 5 with 400 parts of solid anhydrous sodium acetate. The whole is stirred for about another ten hours at room temperature and then the reaction mixture devoid of diazonium salt is heated for another hour at 70° to 80°C, suction filtered while hot, washed with water and dried. 500 parts of a greenish yellow pigment of formula (II) is obtained.

To optimize the properties of the pigment obtained it is stirred for from 3 to 4 hours in 10 times its weight of glacial acetic acid at 100° to 110°C, suction filtered while hot, washed with water and dried.

EXAMPLES 2 TO 6

The procedure of Example 1 is repeated but the amines set out in the Table are used as diazotization components and the acetoacetanilides set out therein are used as coupling components. Pigments are obtained with the hues indicated.

TABLE

| Ex. | Aminoanthraquinone | Acetoacetanilide | Hue |
|---|---|---|---|
| 2 | 1-amino- | CH$_3$COCH$_2$CONH–⟨phenyl⟩–N(CO)$_2$⟨phenyl⟩ | Yellow. |
| 3 | 1-amino-4-chloro- | CH$_3$COCH$_2$CONH–⟨phenyl⟩–N(CO)$_2$⟨phenyl⟩ | Do. |
| 4 | do. | CH$_3$COCH$_2$CONH–⟨phenyl⟩–N(CO)$_2$⟨phenyl⟩ | Do. |
| 5 | 1-amino-3-chloro- | CH$_3$COCH$_2$CONH–⟨phenyl⟩–N(CO)$_2$⟨phenyl⟩ | Do. |

TABLE—Continued

| Ex. | Aminoanthra-quinone | Acetoacetanilide | Hue |
|---|---|---|---|
| 6 | do | 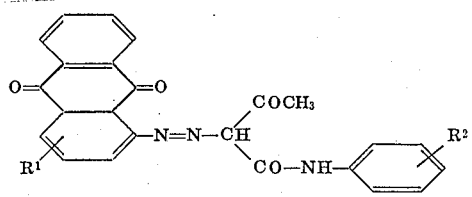 | Do. |

EXAMPLE 7

10 parts of the pigment obtained according to Example 1 and 95 parts of baking varnish mixture [consisting of 70% of coconut alkyd resin (60% in xylene) and 30% of melamine resin (about 55% in a mixture of butanol and xylene)] are ground in an attritor mill. The mixture is applied to a substrate and baked for 30 minutes at 120° C. Brilliant greenish yellow full tone coatings are obtained having very good fastness to light, weathering and overspraying. Reduction with titanium dioxide gives bright shades.

Similar coatings in the hue given in the Table are obtained when the pigments described in the other Examples are used.

EXAMPLE 8

0.5 part of the pigment obtained according to Example 1 is incorporated into 100 parts of styrene at from 190° to 200° C in an extruder. A greenish yellow transparent coloration of excellent fastness to light is obtained.

Colorations of good hiding power are obtained by additionally incorporating 1 part of titanium dioxide.

Similar results are obtained when pigments from Examples 2 to 6 are used.

EXAMPLE 9

8 parts of the pigment obtained according to Example 1, 35 parts of rosin modified with phenol-formaldehyde and 60 parts of toluene are intimately mixed in a dispersing unit. A greenish yellow toluene intaglio printing ink is obtained having outstanding fastness to light and weathering and outstanding brilliance.

Similar results are obtained when pigments from Examples 2 to 6 are used.

We claim:

1. An azo pigment of the formula:

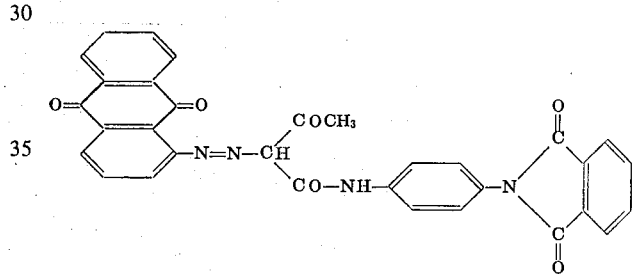

in which
R$^1$ is hydrogen or chloro in the meta-position or para-position to the diazo group; and
R$^2$ is phthalimido in the meta-position or para-position.

2. The azo pigment of the formula:

* * * * *